United States Patent [19]

Pirlet

[11] 4,264,203
[45] Apr. 28, 1981

[54] INSPECTION OF THE INTERIOR OF AN ENCLOSURE

[75] Inventor: Robert A. Pirlet, Embourg, Belgium

[73] Assignee: Centre de Recherches Metallurgiques-Centrum Voor Research in de Metallurgie, Brussels, Belgium

[21] Appl. No.: 62,478

[22] Filed: Jul. 31, 1979

[30] Foreign Application Priority Data

Jun. 11, 1979 [BE] Belgium ............................. 6/46.860

[51] Int. Cl.³ ........................................... G01N 21/90
[52] U.S. Cl. ..................................... 356/241; 350/6.9
[58] Field of Search ................... 350/6.5, 6.9, 22, 319; 356/43, 241; 250/563

[56] References Cited

U.S. PATENT DOCUMENTS 3,023,662   3/1962   Hicks, Jr. ............................. 350/6.5

Primary Examiner—John K. Corbin
Assistant Examiner—Matthew W. Koren
Attorney, Agent, or Firm—Holman & Stern

[57] ABSTRACT

An assembly of light path deflectors is arranged so that radiation is transmitted along a folded optical path to an observation or measuring instrument (e.g. a pyrometer) from a point on a surface in an enclosure such as a blast furnace. The point is scanned along a scanning path (preferably spiral) which is uniformly distributed about the intersection of the surface with the sighting axis of the instrument, by simultaneously rotating the assembly and rotating at least one of the deflectors.

10 Claims, 6 Drawing Figures

INSPECTION OF THE INTERIOR OF AN ENCLOSURE

FIELD OF THE INVENTION

The present invention relates to a method and a device enabling inspection of a surface in the interior of an enclosure, for the purpose of observation or for carrying out particular measurements, for example thermometric measurements.

The following description is largely based on the application of this method and device to the inspection of the burden or charge in a blast furnace, but this is simply by way of example. The method and device may, in effect, be used for the inspection of the interior of any enclosure.

BACKGROUND OF THE INVENTION

The determination of the level and temperature of the surface of the burden in a blast furnace (or any other shaft furnace) is well known and the applicants have already advocated the use of equipment for this purpose, this equipment giving very good results, in particularly advantageous conditions from the economic point of view. Such equipment comprises in particular an assembly of deflectors for scanning all or part of the surface to be observed and may be described as follows, with reference to FIG. 1 of the accompanying drawings.

BRIEF DESCRIPTION OF THE DRAWINGS

FIG. 3b is a section on line A-B of FIG. 3a; and

Figure 1:
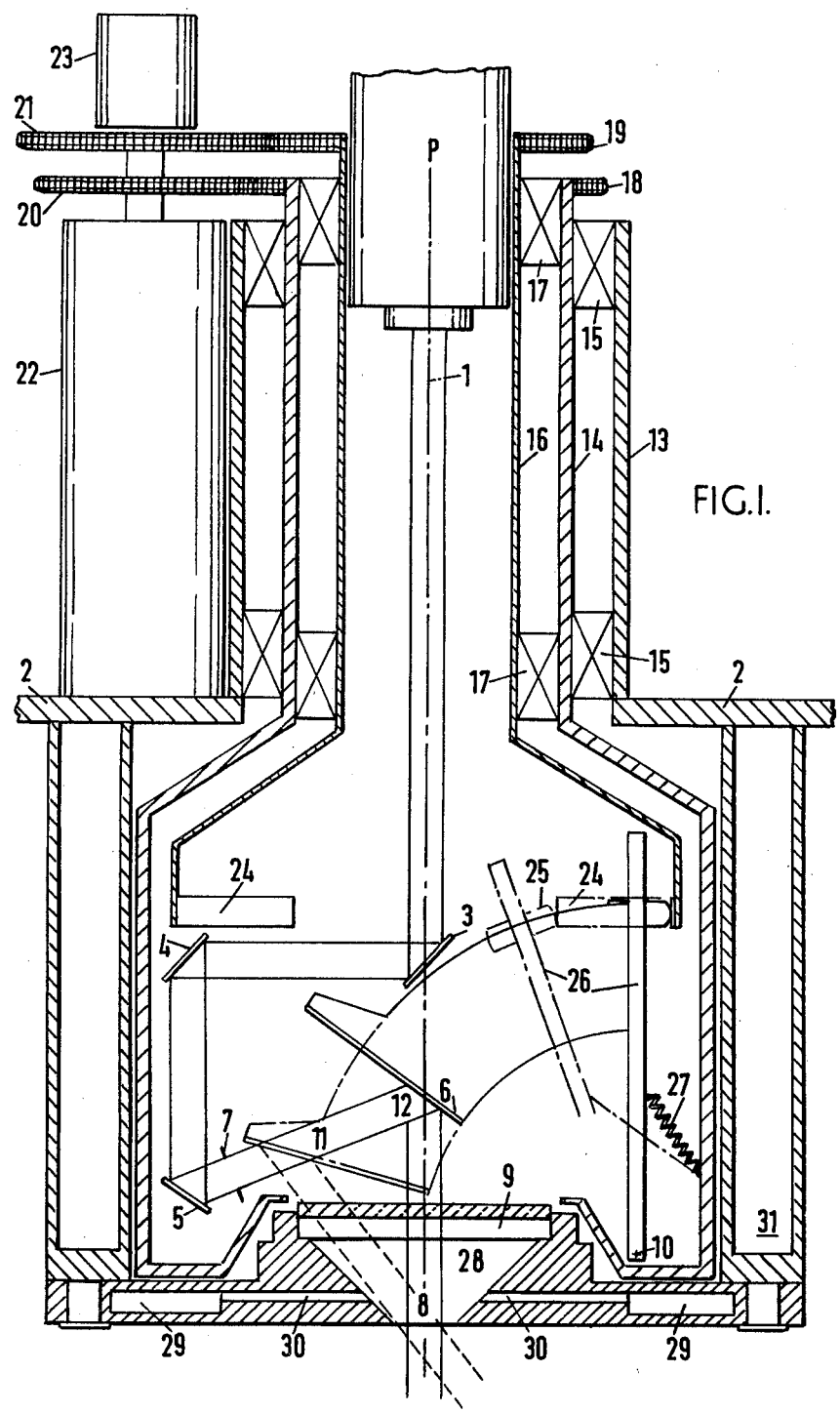
FIG. 1 is a schematic vertical section through a device for inspecting the interior of an enclosure.

The device illustrated in FIG. 1 has a measuring instrument in the form of a pyrometer P having a sighting axis 1. The pyrometer P is mounted indirectly on a support 2. The optical path from the pyrometer is contained in a single plane, but is folded so as to follow a non-rectilinear path by the action of deflectors formed by plane mirrors 3, 4, 5, 6, and passes through an observation orifice 8 before entering the enclosure (not shown) whose interior is to be inspected. The orifice 8 is located in front of a transparent shield 9. A diaphragm 7 delimits a constant aperture for the optical system. A focusing device (not shown) focuses onto the pyrometer P the radiation received along the optical path.

The plane mirrors 3, 4, 5 are fixed with respect to one another and only the plane mirror 6 is movable, in the sense that it can rotate about an axis 10 perpendicular to the plane containing the optical path and the sighting axis 1. The axis 10 is located outside the path followed by the radiation from the orifice 8 to the pyrometer P. The movable mirror 6 is shown in two different positions. As can be clearly seen, the position of incidence of the optical path (respectively 11 and 12) is subjected to a translational movement, while the angle of incidence changes during the displacement of the movable mirror 6, so as to vary the angle of the end part of the optical path adjacent the observation orifice 8.

The movement of the mirror 6 is obtained as follows. A tube 13 rigidly fixed to the support 2 is connected to a rotatable tube 14 by means of needle bearings 15. Within the rotatable tube 14, a second rotatable tube 16 is kept in position by two needle bearings 17. Rotary movement is transmitted to the tubes 14 and 16 by means of toothed rings 18 and 19 respectively driven by two toothed wheels 20, 21 which are in turn driven by a motor 22 mounted on the support 2. A position indicator 23 is also provided. A cam 24 is located at the end of the tube 16, the movement of the cam 24 displacing the axis of a roller 25 mounted on an arm 26 rigid with the mirror 6. A return spring 27 acting on the rotatable arm 26 urges the roller 25 into contact with the cam 24.

The assembly of the mirrors 3, 4, 5, 6 is rotatable with tube 14 about an axis coincident with the sighting axis 1, so that the plane in which the optical path lies can be rotated about the said axis.

The system formed by the components 18, 19, 20, and 21 drives the tubes 14 and 16 at different predetermined speeds so that, if the tube 14 effects for example 10 rotations, the tube 16 effects 11 rotations in the same direction. Consequently, during the 10 rotations of the tube 14, the mirror 6 effects a complete forward and backward movement, since the tubes 14 and 16 perform a complete revolution to each other.

Scanning of the surface to be inspected inside the enclosure is ensured by the two movements: on the one hand, the movement provided by the rotation of the movable mirror 6 about an axis transverse to the axis 1 and, on the other hand, that provided by the rotation of the assembly of the mirrors 3, 4, 5, 6 about an axis coinciding with the sighting axis 1.

A gas box 28 is provided in front of the shield 9 so as to act as a cushion between the shield and the inside of the enclosure. The gas box 28 is fed with gas from an annular space 29 by way of conduits 30.

It is possible to readily disassemble the shield 9 from its support, which is mounted on the gas box 28, which is, in turn, bolted to a cooling water jacket 31.

Figure 2A:
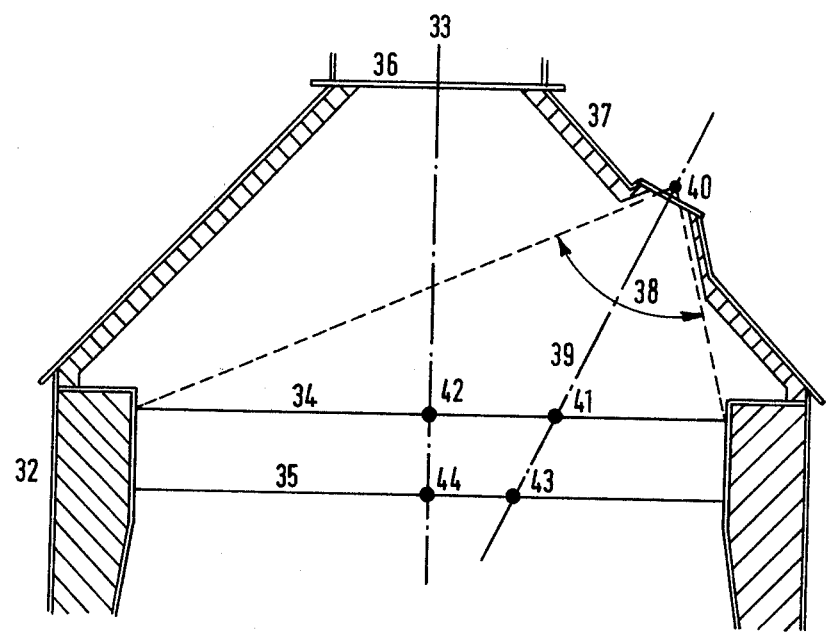
FIG. 2a is a vertical section through the throat of a blast furnace.
Figure 2B:
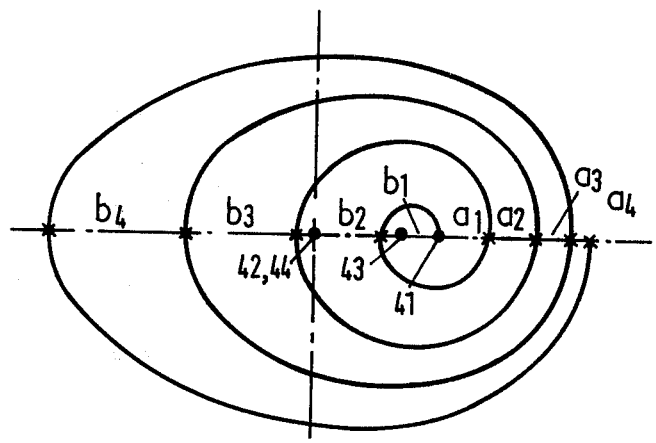
FIG. 2b is a horizontal projection of the upper surface of the burden in the furnace.

Experiments have shown that excellent results are obtained when the points of the scanning path on the surface which is being inspected are distributed uniformly around the centre of sight, which is defined as being the intersection of the sighting axis of the measuring instrument with the surface to be inspected. However, it is to be noted that obtaining a uniform distribution may present certain difficulties according to the position of the sighting axis of the measuring instrument with respect to the surface to be inspected, in particular when the axis is not perpendicular to the surface. It is not always possible to position the device so as to avoid these difficulties, in particular in the case of blast furnaces, as will be explained as follows with reference to FIGS. 2a and 2b, which show respectively a diagrammatic elevated section of the mouth of a blast furnace and a horizontal projection of the surface of the burden in the blast furnace.

The blast furnace 32 has a vertical axis 33 and maximum 34 and minimum 35 levels of the surface of the burden, shown as horizontal to simplify the drawing and the description. The most suitable position for the instrument for measuring the temperature at various points on the surface of the burden is obviously plumb with the charging aperture 36, as in this way the sighting axis of this instrument is permanently perpendicular to the surface to be observed, whatever the level of this surface. However, this aperture is very congested and the measuring instrument therefore has to be positioned on the lateral wall 37 of the throat of the blast furnace. The necessity of covering the entire surface of the burden, whatever its level (in particular at its maximum level 34), with the field of vision 38 of the device determines the optimum position of the device. Consequently the position of the sighting axis 39, represented by the optical centre 40 of the instrument, is set without satisfying the condition of the perpendicularity of the axis to the surface of the burden.

Moreover, the centre of sight is displaced across the surface to be inspected, when the level of the surface varies. For example, when this surface is at the maximum level 34, the centre of sight is at a point 41, the geometric centre being at a point 42, whereas when the surface is at the minimum level 35, the centre of sight is at a point 43 which is near the geometric centre 44. It can be seen that in this non-perpendicular situation the distribution of the points of the path of scanning around the centre of sight is not uniform. In accordance with FIG. 2b, which represents a horizontal projection of the surface of the burden at the maximum level 34, it can in fact be seen that on one side of the projection of the centre of sight 41, the distances $a_1, a_2, a_3, a_4, \ldots$ between successive turns of the scanning path are increasingly small and that on the opposite side, the distances $b_1, b_2, b_3, b_4, \ldots$, also between successive turns, are increasingly large, moving away from the centre of sight. This irregularity in the distribution of the scanning path over the surface obviously constitutes a drawback affecting the accuracy of the measurement results, for example measurements of the temperature of the burden.

The object of the present invention is a method enabling these drawbacks to be obviated.

SUMMARY OF THE INVENTION

The method of the present invention, in which the surface to be inspected in the interior of an enclosure is scanned by means of an assembly of deflectors ensuring transmission along a broken line of the radiation between the interior of the enclosure and the observation or measuring instrument located externally, by rotating the assembly of deflectors about an axis coincident with the sighting axis of the instrument and by simultaneously rotating at least one of the deflectors about an axis perpendicular to the plane containing the broken line, is substantially characterised in that a uniform distribution of the points of the scanning path around the centre of sight is ensured by causing at least one of the said deflectors to rotate about an axis perpendicular to the plane containing the said broken line.

DESCRIPTION OF PREFERRED EMBODIMENTS

According to an embodiment of the invention, the or each movable deflector is rotated in relation to the assembly by means of a cam providing the scanning path with the shape of a spiral having equidistant turns which are developed uniformly around the centre of sight when the sighting axis of the instrument is perpendicular to the surface to be inspected. A cam of this type (with a cam surface of cardioid shape) is shown in FIG. 3a (horizontal projection) and 3b (section), FIG. 3c relating to a scanning path having the form of a spiral with equidistant turns ($a_1=a_2=a_3=a_4=b_1=b_2=b_3=b_4$).

Figure 3A:
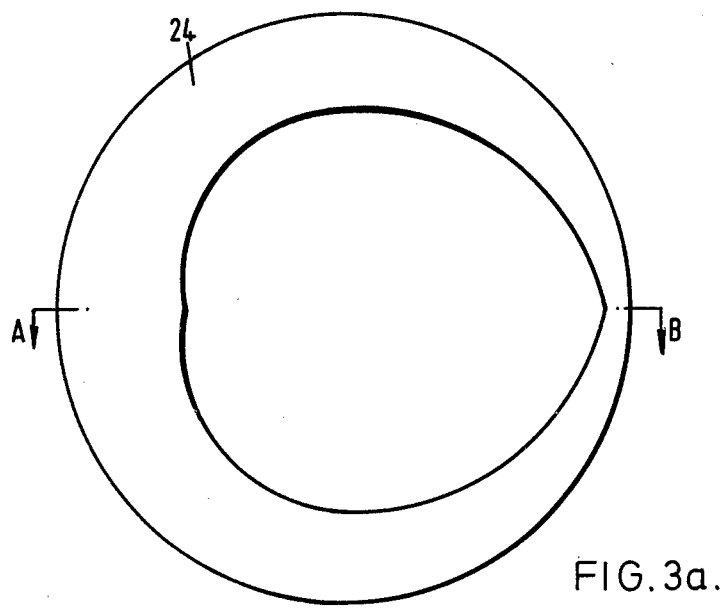
FIG. 3a is a plan view of a cam in the device of FIG. 1.

According to another embodiment of the invention, the cam controlling the displacement of the or each movable deflector in relation to the assembly is adapted by modifying certain portions of the regular shape of the cam surface shown in FIG. 3a. This embodiment is particularly advantageous in the case in which the sighting axis of the instrument is oblique (not perpendicular) to the surface to be observed.

According to a particularly advantageous embodiment of the invention, the temperature at various places on the surface to be inspected is measured by detecting radiation of a chosen wavelength emitted by the surface. The wavelength of this radiation is selected, preferably between 3.9 and 4.1 micrometers, in such a way as to minimise the effect of absorption of the radiation by the gases present between the observed surface and the measuring instrument, as well as the effect of dust and variations of the emission coefficient (emissivity) of the surface.

The surface to be observed may be the surface of the burden in a shaft furnace, in particular a blast furnace.

Figure 3B:
Figure 3C:
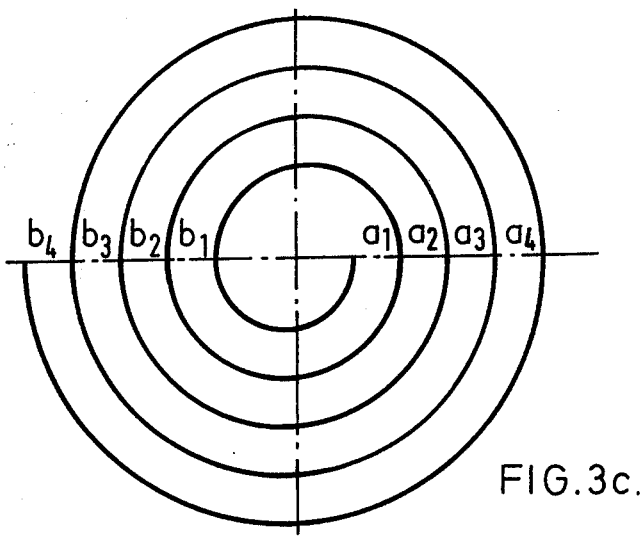
FIG. 3c shows a preferred scanning path.

The invention also relates to a device for implementing the method described above, this device being as described above and illustrated in the accompanying drawings. This device in particular comprises:

(a) an observation or measuring instrument sensitive to the radiation of an emitter and/or to the radiation of the surface to be inspected, in a range of selected wavelengths; for example, in the case of measuring the temperature of the surface of the burden in a blast furnace, the instrument is preferably a pyrometer sensitive to the thermal radiation from the surface of the burden;

(b) means for scanning all or part of the surface, comprising:

an assembly of deflectors, at least one of which is movable in relation to the others, which assembly ensures the transmission along a broken line of the radiation between the surface to be inspected and the observation or measurement instrument located outside the enclosure, one portion of the said broken line being coincident with or parallel with the sighting axis of the observation or measurement instrument, means for rotating the movable deflector(s) in relation to the assembly about an axis perpendicular to the plane containing the said broken line, and means for rotating the assembly of deflectors about an axis located in the plane containing the broken line and coincident with or parallel with a portion of the said broken line;

(c) means for focusing and filtering the radiation on the sensitive surface of the observation or measuring instrument or on a diaphragm interposed in the path of the said broken line; and (d) a support on which are located, in a fixed manner, the observation or measurement instrument and the axis of rotation about which the assembly of deflectors is designed to rotate, as well as the means for rotating this assembly, with the improvement that the means for rotating the movable deflector(s) with respect to the assembly comprises a cam of regular shape, for example of the type shown in FIGS. 3a and 3b, or (preferably, in the case of a blast furnace) a cam of special shape resulting from a suitable modification of certain portions of the regular shape of the type shown in FIGS. 3a and 3b; by means of this improvement, it is possible to ensure a uniform distribution of the points of the scanning path around the centre of sight.

I claim:

1. A method of inspecting a surface in the interior of an enclosure by means of an observation or measuring instrument having a sighting axis and being located outside the enclosure, and an assembly of light path deflectors arranged so that radiation is transmitted from a point on the said surface to the instrument along a folded optical path, the method comprising scanning the said point along a scanning path which is uniformly distributed about the intersection of the sighting axis with the said surface, scanning being performed by rotating the assembly of deflectors about an axis coinciding with the sighting axis and simultaneously rotating at least one of the deflectors about an axis perpendicular to the plane of the folded optical path.

2. The method of claim 1, in which the scanning path is spiral with equidistant turns spaced uniformly around the intersection of the sighting axis with the surface.

3. The method of claim 1 or 2, in which the rotation of the at least one rotatable deflector is controlled by a cam, the assembly rotating relative to the cam.

4. The method of claim 1 or 2, in which the sighting axis is oblique to the surface.

5. The method of claim 1, including rotating the at least one rotatable deflector by means of a cam providing the scanning path with the shape of a spiral having equidistant turns spaced uniformly around the intersection of the sighting axis with the surface, the sighting axis being perpendicular to the surface.

6. The method of claim 5, further comprising, when the sighting axis is oblique to the surface, modifying parts of the cam in order to maintain a scanning path with the shape of a spiral having equidistant turns spaced uniformly around the intersection of the sighting axis with the surface.

7. The method of claim 1, in which the radiation transmitted to the instrument is radiation of a selected wavelength emitted by the surface.

8. The method of claim 1 or 7, in which the surface is the upper surface of the burden in a shaft furnace.

9. A device for inspecting a surface in the interior of an enclosure, the device comprising an observation or measuring instrument having a sighting axis; an assembly of light path deflectors arranged so that radiation is transmitted from a point on the surface along a folded optical path; means for rotating at least one of the deflectors about an axis perpendicular to the plane of the optical path; means for rotating the assembly of deflectors about an axis coinciding with the sighting axis; and means for controlling the rotation of the at least one rotatable deflector in relation to the rotation of the assembly so that the scanning path of the said point on the surface is uniformly distributed about the intersection of the sighting axis with the surface.

10. The device of claim 9, in which the controlling means comprises a cam, the assembly rotating relative to the cam, in operation of the device.

* * * * *